3 Sheets—Sheet 1.

E. W. BULLARD.

Hay Spreader.

No 2,992.

Reissued June 16, 1868.

THE NORRIS PETERS CO., PHOTO-LITHO., WASHINGTON, D. C.

3 Sheets—Sheet 2.

E. W. BULLARD.

Hay Spreader.

No 2,992.

Reissued June 16, 1868.

THE NORRIS PETERS CO., PHOTO-LITHO., WASHINGTON, D. C.

3 Sheets—Sheet 3.

E. W. BULLARD.

Hay Spreader.

No 2,992. Reissued June 16, 1868.

THE NORRIS PETERS CO., PHOTO-LITHO. WASHINGTON, D. C.

UNITED STATES PATENT OFFICE.

E. W. BULLARD, OF BARRE, MASSACHUSETTS.

IMPROVEMENT IN HAY-SPREADERS.

Specification forming part of Letters Patent No. 32,350, dated May 21, 1861; Reissue No. 2,992, dated June 16, 1868.

*To all whom it may concern:*

Be it known that I, E. W. BULLARD, of Barre, in the county of Worcester and State of Massachusetts, have invented a new and useful Hay Spreader and Turner for Spreading and Turning Hay and for Other Purposes; and I do hereby declare that the following is a full, clear, and exact description of the same, reference being had to the accompanying drawings, and to the letters of reference marked thereon, forming a part of this specification, and in which—

Figure 1:
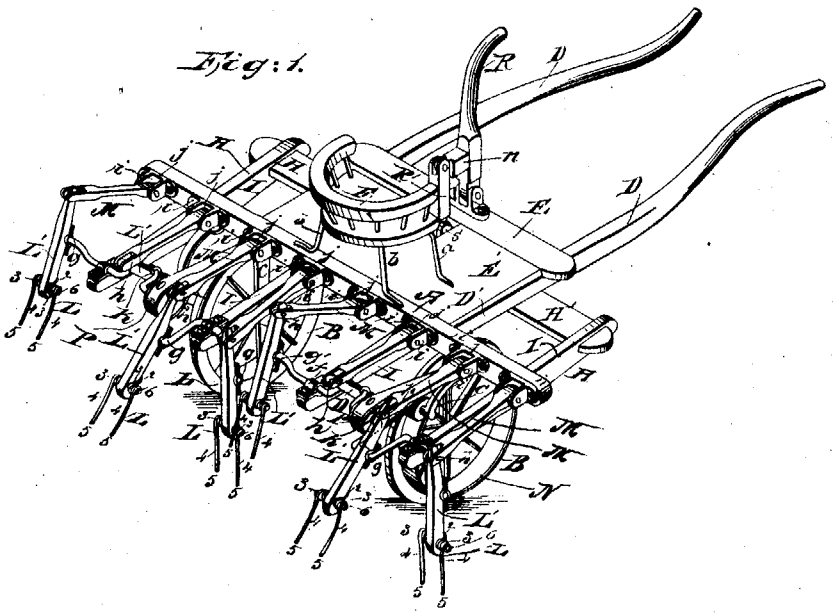
Figure 2:
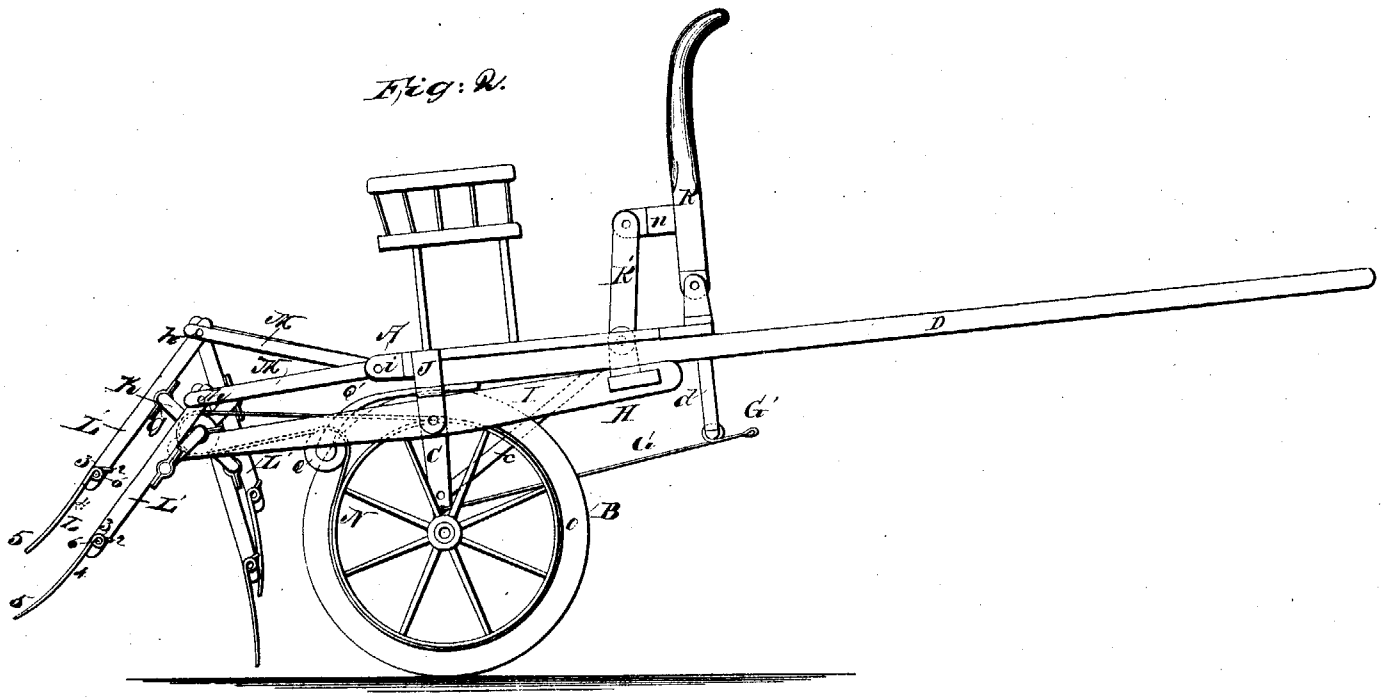
Figure 3:
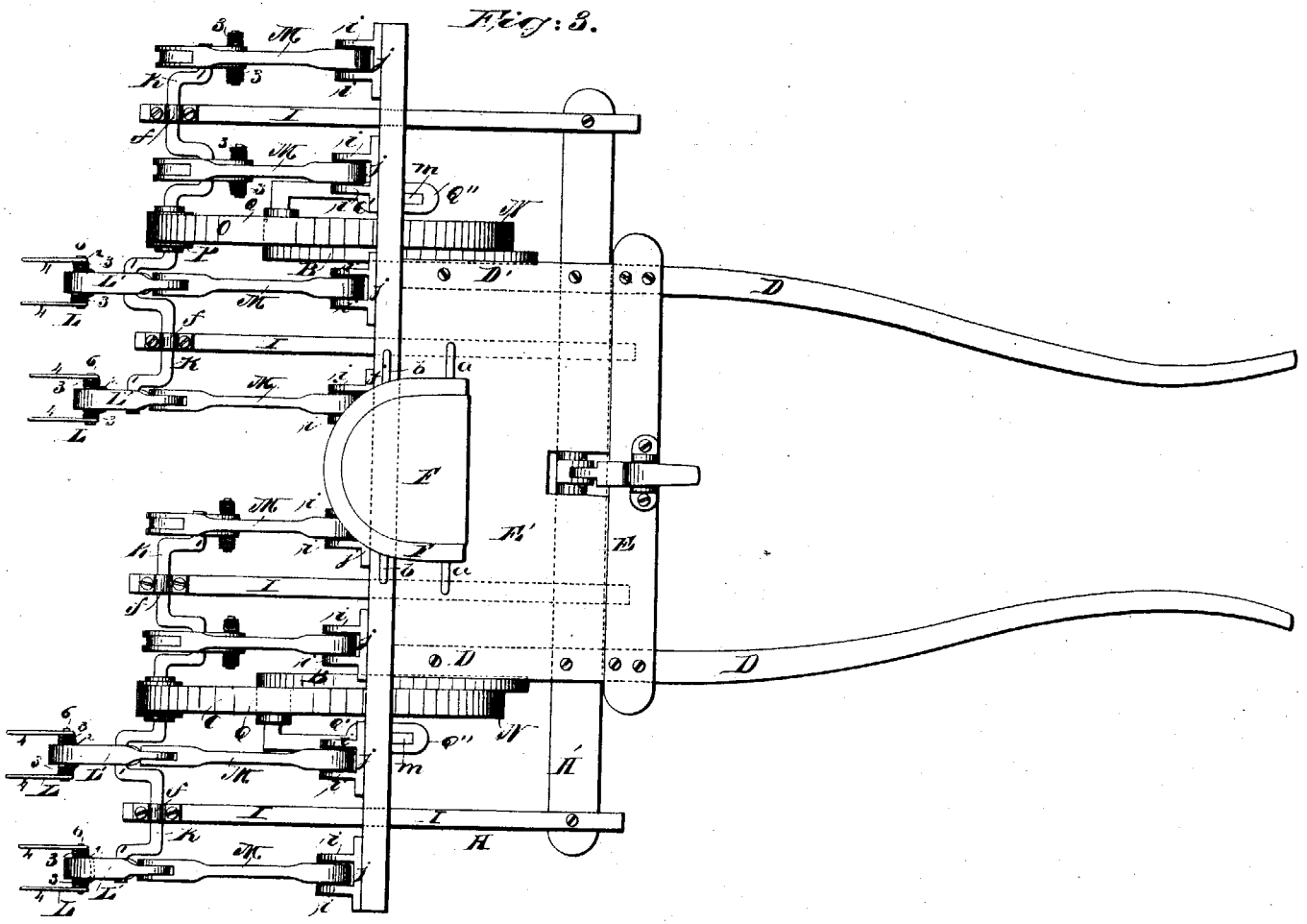

Figure 1 represents a perspective view of my hay spreader and turner. Fig. 2 represents a side view of the same, and Fig. 3 represents a plan or top view of the same.

To enable those skilled in the art to which my invention belongs to make and use my hay spreader and turner, I will proceed to describe my invention more in detail.

In the drawings the same letters of reference indicate corresponding parts in all the figures.

The rear cross-piece, A, of the main frame is supported by the main driving and ground wheels B B, in this instance by means of downwardly-projecting arms C C, the lower ends of which are securely fastened to the axles or journals upon which said wheels turn, while the upper ends of said arms are securely fastened to the cross-piece A.

The rear ends, D′ D′, of the shafts or thills D D are extended back and fastened to the cross-piece A, while said extended ends are united in front by the cross-piece E, the space between cross-pieces A and E being covered by a planking, E′, which serves as a footboard, and also as a support for the front legs, *a*, of the driver's seat F, while the rear legs, *b*, of said seat are supported upon the rear cross-piece, A.

The arms C C may be braced from cross-piece E or the extended ends D′ of the thills, as indicated at *c*, Fig. 2.

Proper draft connection or connections may be attached to the lower ends of the arms C C, and extended forward to near the front of the main frame, as indicated in Fig. 2, the front end or ends of said connection or connections being supported from the front of the main frame by a downwardly-projecting piece or pieces, *d*, in a proper position for the convenient attachment of the horse or team to the machine. I prefer to have a draft-connection, G, on each side, the front end, G′, being made in the form of whiffletree-hooks to receive the tug-hooks.

When the machine is to be made so as to be drawn with a span or two horses abreast, the shafts or thills D D are to be dispensed with and a center pole or tongue fastened to the main frame A D′ E.

An auxiliary frame, H, composed of the cross-piece H′ and the longitudinal pieces I I I I is hung or suspended from the main frame, so as to vibrate on pivots or journals *e*, supported in the lower ends of the hanger-pieces J, the upper ends of which are fastened to the cross-piece A. There may be hanger-pieces J for supporting each of the longitudinal pieces I, if preferred. The relative arrangement of the arms J in respect to the longitudinal pieces I is fully indicated in Fig. 2.

Upon the rear ends of the longitudinal pieces I of the auxiliary frame H are supported in suitable bearings, *f*, two crank-shafts, K, each shaft having in this instance four cranks, and from each crank is suspended a fork, L, the arm or handle, L′, of each fork having a box or bearing, *g*, for the purpose of attaching said arms or handles to their respective cranks, as indicated in the drawings.

The upper ends of the arms or handles L′ of the forks are hinged or pivoted at *h* to the rear ends of arms or levers M, the front ends of which are hinged or pivoted between the ears *i* of the pieces *j*, fastened to the rear of the cross-piece A of the main frame.

The forks L are made in this instance from a single piece of metal wire, the center of which is bent into a loop, 2, after which each end of the wire wound or formed into a coil, 3, one coil being on each side of the loop 2, after which the ends of the wire are projected from the ends of the coils parallel, or nearly so, to each other to form tines 4 4, the lower ends, 5 5, of which are curved back and up, as fully indicated in the drawings, for a purpose hereinafter named.

The forks L are attached to the lower ends of the arms or handles L′ by means of journals or coil-supports 6, which pass through the coils 3 of the forks and through holes in the lower ends of the arms or handles L′. The journals or coil-supports 6 are attached or connected to the arms or handles L′, so as not to work out laterally while the machine is in operation, thus leaving the coils free to spring or contract and expand upon each end thereof without liability of becoming displaced or detached from said coil-supports. It will thus be seen that the ends of the arms or handles L′, fitting in between the coils and into the loops as they do, serve as guides to retain the coils and their supports from too much lateral play or motion, while allowing a free springing motion to the coils upon their journals or supports.

The main supporting and carrying wheels B B are provided with wide flanges N N, to receive the belts O O, which pass around pulleys P P on their respective crank-shafts K. The under sides of the belts pass over friction or binder pulleys Q Q, supported on the rear downwardly and then laterally projecting ends of the arms Q′ Q′, the front ends Q″ Q″ of which are fastened to the under side of the cross-piece A of the main frame.

The ends Q″ Q″ are slotted, as shown at *m m*, and through which the holding bolts or screws pass to bind and fasten said arms to the cross-piece A, and by means of which slots said arms can be set forward or back to tighten up or loosen the belts O O.

Upon the cross-piece E is hinged a lever, R, having an arm or projection, *n*, to the end of which is hinged the upper end of the connection R′, the lower end of said connection being hinged to a stand, S, fastened to the cross-piece H′ of the auxiliary frame H.

The driver, from his seat on the machine, by drawing lever R toward him, can depress the front of the auxiliary frame H, and thus elevate the rear ends of the pieces I, together with shaft K and the forks L. If, however, the driver pushes lever R forward, the front of frame H is elevated and the rear depressed, thus lowering the forks nearer to the ground. If the driver wishes to stop the motion of the forks, he can do so by drawing lever R toward him sufficiently to elevate the rear of the frame enough to loosen the belts, so that they will slip on the pulleys P P. It will thus be seen that the driver from his seat on the machine can easily elevate the forks to pass obstructions or depress or elevate them to work at any desired height above the ground, and can also stop and start the forks without stopping the team.

The operation is as follows: As the machine is drawn over the new-mown grass or hay or material to be turned or spread, a rapid rotary motion is imparted to the shafts K K from the wheels B B through the instrumentalities of the belts O O. As the shafts K K are revolved, their cranks 1 are moved in the arcs of circles, and carry with them the forks L and the lower ends of arms or handles L′, which forks and arms or handles L′ are rocked back and forth on the cranks 1 during the operation, as hereinafter described, through the instrumentalities of the hinged arms M, the crank 1 serving as moving fulcrums for the forks to rock on, whereby the forks have imparted to them a quick sweeping back and up motion until the cranks reach horizontal planes on a line, or nearly so, with the bearings of shafts K, when the tines of the forks are suddenly depressed or dropped back by having a retrograde or lag motion imparted to the forks by the combined action of their moving fulcrums and hinged arms M, the latter preventing any back movement to the upper ends of the fork arms or handles, thus causing the tines of the forks to have a retrograde motion. As the forks are carried up and forward by their moving fulcrums, which move in the arcs of circles, the forks are carried forward above the hay and then brought down into the hay or the material to be spread, so that the tines stand in nearly vertical positions when they reach their lowest points of descent, as indicated in Fig. 2. After the tines have again entered the hay, they are moved back and up again by a sweeping or accelerated motion, which corresponds somewhat to the motion imparted to a fork when the hay is turned or spread by hand, thus differing from all the other machine hay spreaders and turners heretofore in use prior to my invention. The effect upon the hay, too, is somewhat similar to the effect produced when the hand-fork is used or employed in turning the hay. The hay is turned over as well as spread. Then, again, by the peculiar motion imparted to the forks I am enabled to use an open frame, or to hang or suspend my forks in an open frame, without liability of the forks catching and winding up the hay. No strippers are required to free the forks from the hay, as is the case when the tines of the forks move in circles or are rigidly attached to the rotating shaft or drum, thus rendering my spreader less complicated and more practical than those machines in which moving or stationary strippers are employed or are necessary to free the forks from the hay and prevent it from clogging the machine.

It will be observed that as the points 5 of the tines are curved or bent back they serve to lift and hold the hay in a very perfect manner. Then, again, as the strain of holding the tines of the forks to their work during the operation of turning or spreading the hay is sustained by the loops 2 between the coils 3, the entire spring of the coils 3 is made available in equalizing the sudden strain and concussion to which the forks are often subjected, and thus the liability of breaking the forks is greatly lessened by the arrangement referred to—viz., that of so combining the forks with their supports as to allow the strain to come upon the loops between the spring-coils of each fork.

As the forks are arranged to act alternately upon the hay, it is spread more evenly than it would be if the forks all acted together.

As the forks are sustained by moving fulcrums, which in turn are supported in an auxiliary frame in the rear and above the axis of the main supporting or ground wheels, they have ample room for operation, while at the same time they act upon the hay on a line back of the tread of the carrying-wheels, whereby the strain on the forks is avoided, which would result from their working if the hay was held down closely by the carrying-wheels.

I prefer to drive the forks at a sufficient velocity to have each fork work over the whole of its line of surface as the machine is driven forward by the team.

It will be seen that as the hinged arms are attached so as to turn at their forward ends on fixed or stationary fulcrums that they act upon the forks so as to give them the sweeping back and up motions above referred to, while at the same time holding them to their work, the forks having rigid connections with their rotating supports. The hinged arms, therefore, it will be seen, perform important functions. By the use of these joints or connections in the attachment or connection of the forks with the operating mechanism and the frame of the machine, I am enabled to obtain the back-sweeping or accelerated motions referred to in a simple manner, while all the parts work easy and free.

It is evident that many variations of the form and proportions of the parts, as well as the number of them and forks, may be made without departing from the principles of my invention. I do not limit my invention to any particular form or arrangement.

Having described and shown one good way or mode in which my improvements may be carried out or applied to a useful purpose, what I claim therein as new and of my invention, and desire to secure by Letters Patent, is—

1. The employment in a hay-spreading machine of mechanism for giving motion to the forks or stirrers, so connected and combined as to give to the fork or forks after they have entered the hay to be spread a sweeping or accelerated back-and-up motion until the hay has been properly raised, and then a down or lag motion for the purpose of disengaging the forks from the hay while the machine is drawn forward by the team, substantially as and for the purposes set forth.

2. Supporting or sustaining the forks in a hay-turning and spreading-machine upon fulcrums which move in the arc of a circle while the hay is being acted upon, said forks having also a rocking or back-and-forward motion upon said moving fulcrums to aid in lifting the hay and being disengaged therefrom by means of hinged levers or arms, substantially as and for the purposes set forth.

3. The combination, in an open-frame hay-spreader, of a series of forks for entering and lifting the hay, and then disengaging themselves from the hay while the team is advancing, substantially in the manner described.

4. Combining each fork with the spreader-frame and the mechanism for operating the forks by means of three joints or flexible connections, for the purposes set forth.

5. The combination, with each spreader-fork, of a jointed arm, one end of which arm is hinged or turns upon a stationary or fixed fulcrum, while the other end is so hinged and combined with the fork as to move and rock the latter upon its moving fulcrum, substantially as and for the purposes set forth.

6. The combination, in an open-frame hay-spreader, of a series of forks arranged to alternately enter the hay, lift it from the ground, and discharge it in the air in rear of the advancing machine, substantially as described.

7. A double-tined fork for a hay turner or spreader, constructed from a single piece of wire, the center of the piece of wire being bent into a loop, and a spring-coil formed on each side thereof, with the ends of the wire projecting from the outer ends of said coils parallel, or nearly so, to each other, with backward curves to form the tines, substantially as described.

8. The combination, with the coils of the spreader-forks, of removable journals or supports upon which the coils are free to spring, but are not fastened thereto rigidly, whereby the said journals or supports can be easily removed from the fork-coils by a lateral movement of the journals or supports, substantially as and for the purposes set forth.

9. The combination of the turner-forks with their handles, so that the strain of holding the tines to their work while lifting the hay shall be sustained by the loops of the forks, whereby the liability of breaking and bending the tines of the forks during the operation of the machine is lessened, substantially as set forth.

10. Giving a number of forks arranged to operate successfully a back-and-forward motion by means of a crank-shaft to accomplish the purposes above set forth, substantially as described.

11. The combination, in a hay-spreader, of the following elements, viz: a series of double-tined spring-forks to act alternately upon the hay to lift and discharge in rear of the machine without the aid of strippers, and an auxiliary frame for supporting the forks from a point in rear of and above the axis of the main supporting-wheels to give room for the proper action of the forks.

12. The combination, in a hay turner or spreader, of the following elements, viz: a series of forks arranged to lift and discharge the hay in rear of the machine without the aid of strippers, as described, a seat for the driver, and mechanism for elevating and depressing the forks, the same mechanism being also used for throwing the forks in and out of action, whereby the driver, from his seat on the machine, can elevate or depress the forks and also throw them in or out of action, substantially as and for the purposes stated.

Witnesses: E. W. BULLARD.

JASON GORHAM,

FREDK. W. JENKINS.